United States Patent
Itay et al.

(10) Patent No.: US 9,400,756 B2
(45) Date of Patent: Jul. 26, 2016

(54) ADAPTER FOR PERSONAL ELECTRONIC DEVICES AND METHODS OF USE THEREOF

(71) Applicant: On Track Innovations Ltd., Rosh Pina (IL)

(72) Inventors: Nehemya Itay, Beit Hillel (IL); Nir Gazit, D.N. Misgav (IL); Yaacov Haroosh, Migdal HaEmek (IL); George Kaplun, Kfar Yona (IL)

(73) Assignee: On Track Innovations Ltd., Rosh Pina (IL)

( * ) Notice: Subject to any disclaimer, the term of this patent is extended or adjusted under 35 U.S.C. 154(b) by 0 days.

(21) Appl. No.: 14/162,245

(22) Filed: Jan. 23, 2014

(65) Prior Publication Data

US 2015/0205734 A1    Jul. 23, 2015

(51) Int. Cl.
G06F 13/12       (2006.01)
G06K 19/06       (2006.01)
G06F 13/10       (2006.01)

(52) U.S. Cl.
CPC .................................... *G06F 13/102* (2013.01)

(58) Field of Classification Search
CPC ......... H04W 4/02; H04L 67/12; G06Q 20/20; G07F 7/02
See application file for complete search history.

(56) References Cited

U.S. PATENT DOCUMENTS

| | | |
|---|---|---|
| 6,161,762 A | 12/2000 | Bashan et al. |
| 8,336,771 B2 | 12/2012 | Tsai et al. |
| 2004/0058649 A1 | 3/2004 | Grady |
| 2007/0155430 A1 | 7/2007 | Cheon et al. |
| 2008/0048042 A1 | 2/2008 | Degauque et al. |
| 2008/0128505 A1 | 6/2008 | Challa et al. |
| 2009/0251291 A1 | 10/2009 | Borcherding |
| 2010/0259216 A1 | 10/2010 | Capomaggio |
| 2011/0212687 A1 | 9/2011 | Foster |
| 2011/0259957 A1 | 10/2011 | Tsai |
| 2011/0309154 A1 | 12/2011 | Englebardt |
| 2011/0312270 A1 | 12/2011 | White |
| 2011/0312382 A1 | 12/2011 | Itay et al. |
| 2012/0293001 A1 | 11/2012 | Chan et al. |
| 2013/0087614 A1 | 4/2013 | Limtao et al. |
| 2013/0095754 A1* | 4/2013 | Moreton et al. .............. 455/41.1 |
| 2013/0095755 A1 | 4/2013 | Moreton et al. |
| 2013/0234658 A1 | 9/2013 | Endo et al. |
| 2013/0293001 A1 | 11/2013 | Miura |
| 2014/0019340 A1* | 1/2014 | Ruder et al. .................... 705/39 |
| 2014/0027519 A1* | 1/2014 | Itay et al. ....................... 235/492 |
| 2014/0131442 A1* | 5/2014 | Morrow et al. ............... 235/440 |
| 2014/0203082 A1 | 7/2014 | Huh |

OTHER PUBLICATIONS

U.S. Appl. No. 13/827,561, filed Mar. 14, 2013, Itay et al.

(Continued)

*Primary Examiner* — Hyun Nam
(74) *Attorney, Agent, or Firm* — Pearl Cohen Zedek Latzer Baratz LLP (57) ABSTRACT

An adapter for converting signals in a first format to signals in a second format for enabling a personal electronic device such as laptop computer, tablet computer, smartphone and the like, to communicate with a contactless smart card reader via another adapter. Embodiments include an adapter for enabling a personal electronic device to communicate, via communication channel comprising data signals over universal serial bus (USB) channel, with a contactless smart card reader.

10 Claims, 7 Drawing Sheets

(56) References Cited

OTHER PUBLICATIONS

Office Action issued by the United States Patent and Trademark Office for U.S. Appl. No. 13/827,561 dated May 22, 2015.

International Search Report and Written Opinion for PCT International Application No. PCT/IL15/50053 dated Jun. 9, 2015.

* cited by examiner

ADAPTER FOR PERSONAL ELECTRONIC DEVICES AND METHODS OF USE THEREOF

BACKGROUND

Smartphones and other personal electronic devices such as tablet computers may incorporate contactless communication capabilities (e.g. Proximity or Near Field Communication (NFC)). Such capabilities, which allow contactless communication with a compatible reader to transmit and receive data, for example, during a payment transaction, can be embedded in the personal electronic device or can be added by an adapter that connects to the personal electronic device. Prior art solutions including the Contactless Payment and NFC Solution for Mobile Devices (COPNI), manufactured and sold by On Track Innovations Ltd. (OTI), connect to the personal electronic device through contact and contactless data communication capabilities and standard subscriber identification module (SIM) capabilities smart chips, such as the SmartMX P5CD080 of NXP Semiconductors N.V., as described in US patent application publication no. 2011/0312382 assigned to OTI. In this solution an NFC antenna is connected to the contactless pins of the smart chip and the smart chip communicates with the smartphone via the contact communication pins.

Adapters for enabling personal devices to communicate with a contactless smart card reader via audio signals have been described in U.S. patent application Ser. No. 13/827,561 and in International patent application No. PCT/IL2013/050293 assigned to OTI.

There is a need for enabling the use of such adapters with personal devices that do not have a headset port. There is a further need to enable the use of such adapters with NFC controllers in cases where there is no need for the presence of an on board secure element as the transaction security is taken care of elsewhere, for example by the personal device or in the cloud. Further, there is a need to enable sufficient sensitivity and responsiveness to radio frequency ("RF") field of the adapters while keeping their physical dimensions as small as possible for hand-held device and comfort of use.

SUMMARY

Embodiments of an adapter are disclosed for converting signals in a first format to signals in a second format, for enabling a personal electronic device such as laptop computer, tablet computer, smartphone and the like, to communicate with a contactless smart card reader via a second adapter. The adapter may include a processor, a first communication connector to connect the personal electronic device to the processor, a second communication connector to connect the processor to the second adapter and a voltage regulator to regulate DC voltage received from said first communication connector and to regulate and provide it to said second communication connector, wherein the first communication connector is a universal serial bus (USB) connector, the first format of signals is compatible with USB signals requirements, the second connector is a headset connector and the second format supports exchanging data modulated over audio signals. The adapter is further characterized in that the processor is adapted to exchange the data in the first format present at the USB connector with data in the second format present at the headset connector, and in that the second adapter is configured to exchange data with the first adapter using the second format.

Embodiments include an adapter for enabling a personal electronic device to communicate, via communication channel comprising data signals over universal serial bus (USB) channel with a contactless smart card reader. The adapter may include a processor, a contact/contactless smartcard chip, an antenna and a power supply unit, wherein said processor is adapted to exchange first data with said personal electronic device. The first data may be for example represented in a USB signal format (e.g., the data is transmitted according to the USB standard, for example via serial signals, with USB start or synchronization packets and end of packet sequences) present at the USB socket and may be further adapted to exchange second data with the smartcard chip wherein the smartcard chip is adapted to communicate with the contactless smart card reader via the antenna. According to some embodiments communication with the personal electronic device may be carried out via the audio channel of the personal electronic device.

In another embodiment an adapter is disclosed for enabling a personal electronic device to communicate, via at least one communication channel from a list comprising channels comprising data signals modulated over an audio channel and a channel comprising universal serial bus (USB) data signals, with a contactless smart card reader. The adapter may include a processor, a near field communication (NFC) controller, an antenna, a headset audio plug, and a power supply unit. The processor may be adapted to exchange first data with the personal electronic device, wherein the first data is in one format from a list comprising data modulated on the audio signals present at the headset audio plug and data in USB signals format present at the USB connector and to exchange second data with the NFC controller. The NFC controller may be adapted to communicate with the contactless smart card reader via the antenna.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Typical contactless smart cards may comprise electronic circuitry, including active units, such as a controller/microprocessor and passive elements, such as an NFC antenna. Some electronic circuitry for contactless smart cards may be able to operate in two modes: contact mode and contactless mode. In contactless mode the electronic circuitry may be powered by RF energy received at the antenna of the device.

Adapters for enabling communication between personal devices, such as smart phones, tablet computers, laptop computers and the like and contact/contactless readers have been described in U.S. patent application Ser. No. 13/827,561 and in International patent application No. PCT/IL2013/050293 each assigned to OTI. These adapters are adapted to communicate with the personal device via the headset socket of the personal device, using the signals in the voice range on which data and control signals are modulated. In order to enable use of such adapters with personal devices that do not have standard headset socket a USB adapter from universal serial bus (USB) connector standard (physical and electrical) to headset standard is required. That is, an adapter that is configured to connect with a personal device via its USB port, to receive via that port controls, data and power supply and to convert these to controls, data and power supply, modulated and appended to standard signals used in a headset port. Alternatively the contactless adapter can be fitted also with a USB connector, allowing it to communicate directly also via USB channel.

Adapters for enabling personal devices to communicate with a contactless smart card reader via audio signals have been described in U.S. patent application Ser. No. 13/827,561 and in International patent application No. PCT/IL2013/050293.

Figure 1A:
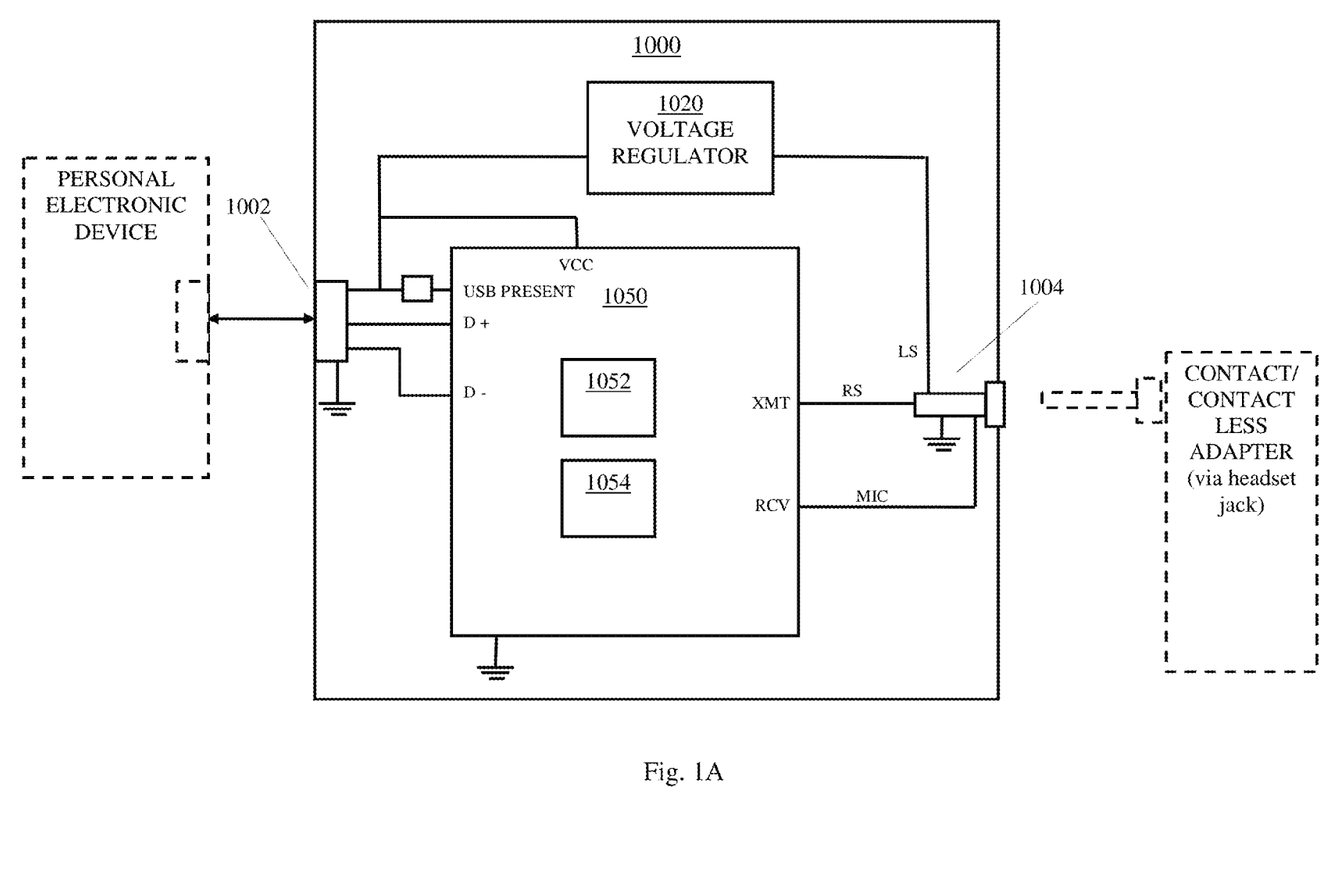
FIG. 1A is a schematic high-level block diagram of an adapter according to embodiments of the present invention.

Reference is made to FIG. 1A which is a schematic high-level block diagram of a USB adapter 1000 according to embodiments of the present invention. Adapter 1000 is configured to communicate with a personal device via a first port or socket supporting signals according to a first format, such as USB port, connector or socket supporting USB signals, and with a contact/contactless adapter via a second port or socket supporting signals in a second format, such as headset port, plug or socket supporting data modulated on audio signals, and to convert signals received from the first port, e.g. USB, to signals conforming with the second port and second format, e.g. headset signals, and vice versa. Adapter 1000 may comprise USB communication connector 1002 adapted to connect to pins D+, D−, GND and USB +V supply signals of a personal device. Adapter 1000 may further include controller 1050 configured to communicate with a personal device via USB communication connector 1002 and with a contact/contactless adapter via headset communication connector 1004. Controller 1050 may be configured to convert signals from contact/contactless adapter to personal device and vice versa. Controller 1050 may be any suitable processor, microprocessor, microcontroller and the like. Controller 1050 may include non-transitory storage means 1052 for storing programs and parameters (which when executed cause controller 1050 to carry out embodiments of the present invention) and non-transitory storage means 1054 for storing data. Adapter 1000 may include voltage regulator 1020 for receiving power supply from the personal device via USB communication connector 1002 and converting it to voltage level adapted to feed the contact/contactless adapter via, for example, its LS line. Controller 1050 may be configured to be responsive to the connection/disconnection of adapter 1000 from the USB connection by means of a "USB Present" signal connected to one of the input pins of controller 1050 and, for example, change the state of controller 1050 from low-activity state (such as 'dormant') to normal activity state, and vice versa. Controller 1050 and other controllers described herein may be configured to carry out embodiments of the invention for example by executing software or instructions which cause the controller to carry out embodiments of the present invention, or for example by having dedicated or hard-wired circuitry.

Programs stored and running on the personal device may communicate with a smart card reader adapter, such as adapter 1200 (FIG. 2) and adapter 1300 (FIG. 3) via USB adapter 1000, for example by the assistance of programs stored and running on USB adapter 1000 which assist in converting the signals and the communication received at the USB connector to those presented at the headset socket and vice versa.

Figure 1B:
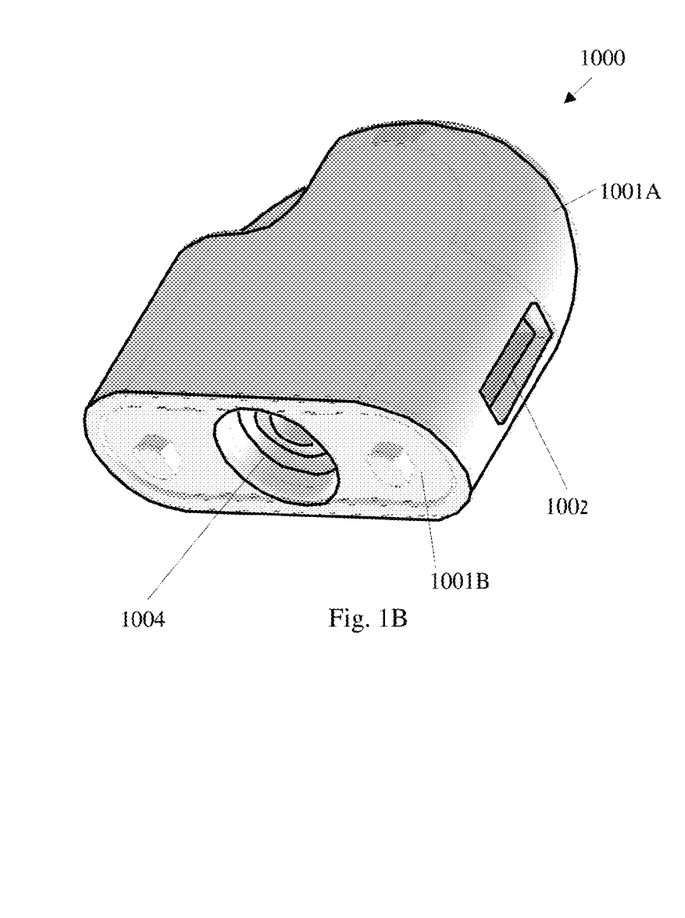
FIGS. 1B and 1C schematically present physical and electrical components placement, in three dimensional (3D) isometric view, of an adapter with and without its external package, respectively, according to embodiments of the present invention.
Figure 1C:
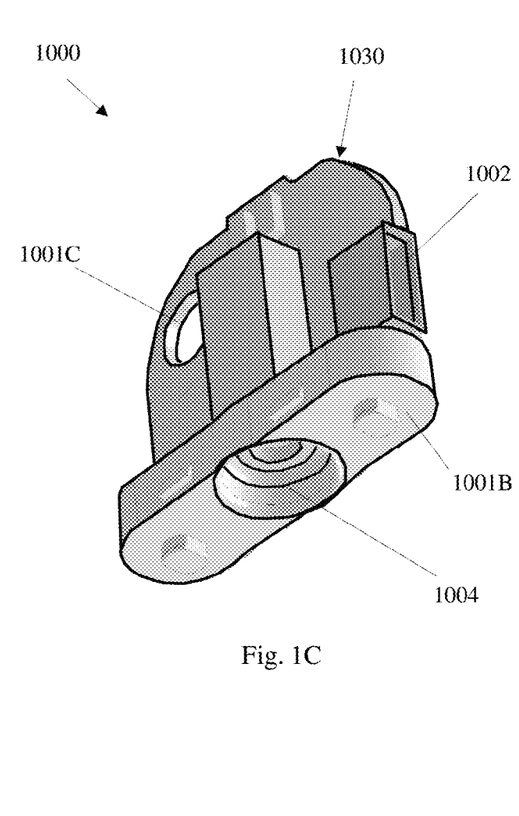

Reference is made now to FIGS. 1B and 1C which schematically present physical and electrical components placement, in 3D isometric view, of adapter 1000 with and without its external package, according to embodiments of the present invention. Adapter 1000 may comprise external package cover 1001A and 1001B which together form a closed package for adapter 1000 with two communication sockets in it. USB communication connector 1002 and headset communication connector 1004 are built to enable connection of a USB plug in USB communication connector 1002 and of a headset jack in headset communication connector 1004. Board 1030 may be used to place all electronics components as well function as electrical and mechanical connecting unit communication connectors 1002 and 1004. Adapter 1000 may be configured with a hole 1001C made in it for example in order to allow attaching the adapter to a key ring. It will be noticed that since adapter 1000 is used to connect an electronic device having a USB port with a contact/contactless smart card adapter, adapter 1000 may be powered from the power supply pin in a USB plug/socket/connector. In some embodiments no other power source may be required.

Figure 2:
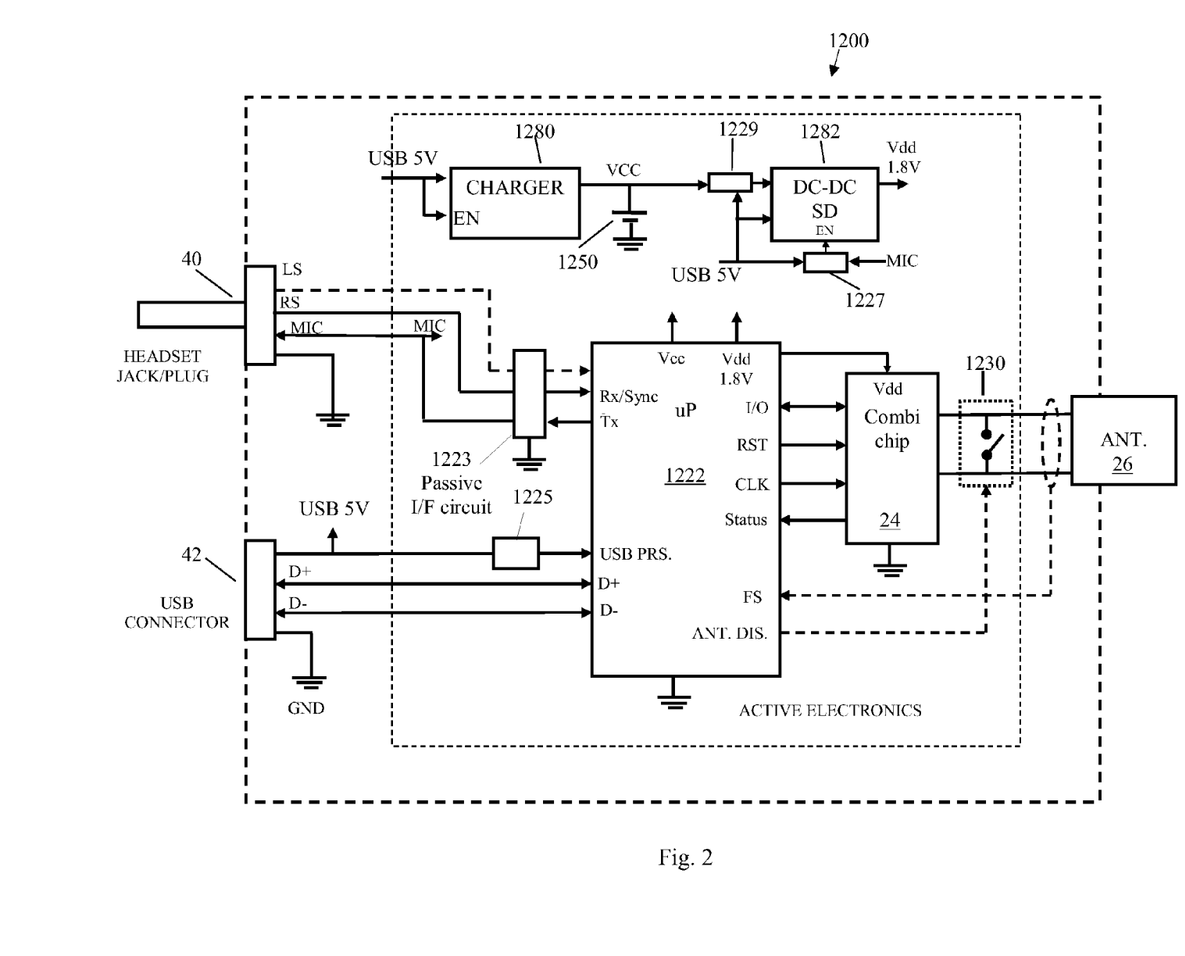
FIG. 2 schematically illustrates an adapter for enabling a personal device to function as a contact/contactless smart card, according to embodiments of the present invention.

Reference is made now to FIG. 2, which schematically illustrates contact/contactless adapter 1200 for enabling a personal device to function as a contact/contactless smart card, according to embodiments of the present invention. Adapter 1200 may comprise processor unit 1222, contact/contactless smartcard chip 24 (sometimes called a combi chip), RF antenna 26, power supply unit, passive interface circuit 1223, headset jack 40 and USB connector 42. Processor unit ("uP") 1222 may be any suitable processor, microprocessor (uP), controller, microcontroller and the like. Combi chip 24 may be any chip adapted or configured to provide and support contactless communication via antenna, such as antenna 26 and contact communication via dedicated pins on it. RF antenna 26 may be any suitable antenna complying with contactless requirements, such as according to ISO 14443 standard. According to some embodiments chip 24 may include Smart Card functionality. Processor 1222 may be configured or adapted to carry out methods according to the present invention, for example by executing software.

Headset jack 40 may be any standard stereo headset jack such as the 3.5 mm stereo jack supporting two audio channels out—LS and RS and one audio channel in—MIC.

Audio channel out RS and audio channel in MIC may form a two way channel for uP 1222, via passive interface 1223, to communicate with any personal electronic device connected to headset jack 40 over an audio channel. Audio channel LS may be routed to uP 1222 to provide synchronizing (sync) signal for the communication. Alternatively the same speaker channel which provides data-in from the personal electronic device, for example RS, can be used to provide both the data signal and the sync signal to uP 1222 (not shown in FIG. 2). The data exchanged between the personal electronic device and uP 1222 via headset plug 40 may include numerical or textual information, value of parameters, control data and the like, as may be required to satisfy the communication between program or programs running on the personal electronic device and program or programs running on uP 1222. This data may be represented by digital electronic signals modulated on audio signals, the audio signals are compatible to standard requirements applicable to audio channel for playing audio signals to headsets and receive audio signals from the headsets.

When adapter 1200 is connected to personal electronic device via USB connector 42 data between the personal electronic device and uP 1222 may be exchanged via lines D+, D− as is the case in USB channel. The data exchanged between the personal electronic device and uP 1222 via USB connector 42 may include numerical or textual information, value of parameters, control data and the like, as may be required to satisfy the communication between program or programs running on the personal electronic device and program or programs running on uP 1222. This data may be represented by electronic signals conforming to the USB communication format.

Adapter 1200 may be powered by battery unit 1250, which may be a battery, a rechargeable battery and the like. Optionally adapter 1200 may comprise charger 1280 that may be powered from the 5V line of a USB socket, when adapter 1200 is connected to a USB port of a personal electronic device. Charger 1280 may be controlled by the presence of 5V from USB connection, so that is it activated only when 5V DC from USB connector 42 is present.

Adapter 1200 may further comprise DC-DC step-down converter 1282 configured to convert input voltage of for example substantially 5V DC to for example substantially 1.8V DC which serves as the main operating supply power for uP 1222. Other specific voltages may be used. Vcc input to uP 1222 is substantially required to support its internal USB interface. Converter 1282 may be controlled by the presence of either/or 5V DC signal from USB connector 42 and MIC DC portion signal, OR'd via combiner unit 1227. The presence of either will enable converter 1282. Converter 1282 may be powered from battery unit 1250 in the absence of 5V DC from USB connector 42 or from 5V DC line from USB connector 42 when it is present.

Passive interface circuit 1223 may comprise, for example, resistors and capacitors (not shown), and may be used to mutually adapt and match the amplitudes and DC levels of the signals exchanged between uP 1222 and a personal electronic device to which adapter 1200 is connected via its earphone headset socket.

uP 1222 may be adapted or configured to communicate with the personal electronic device by the receiving of audio signals modulated with digital data and/or instructions from RS line. uP 1222 may be further adapted to modulate audio signal with data and send it over audio in channel MIC to the personal electronic device. uP 1222 may be adapted to use the audio signal over RS also as a synchronization signal for its data transmission to the personal electronic device. In alternative embodiment LS line may be used instead of RS line for transmitting modulated data from the personal electronic device to the USB adapter and optionally also for synchronizing transmission to the personal electronic device.

uP 1222 may further be adapted to communicate with combi chip 24 via pins on both uP 1222 and combi chip 24, utilizing bi-directional input/output (I/O) data channel with combi chip 24, providing power (Vdd), clock (CLK) and reset (RST) signals to combi chip and receiving status signal from combi chip 24 thus enabling ON/OFF control in contact mode of combi chip 24 from uP 1222. The two way input/output (I/O) channel allows sending and receiving data and/or instructions between uP 1222 and combi chip 24.

Combi chip 24 may be a standard dual mode contact/contactless smart card IC chip, adapted to support communication in both modes, such as the P5CD080 chip provided by NXP Semiconductors N.V. Combi chip 24 may be of a kind that does not allow concurrent communication in contact and in contactless modes. In such embodiments a mechanism is provided to control and guarantee proper switching between the modes of operation of combi chip 24, as is explained in details herein below.

In order to control and coordinate the operation of combi chip 24 in its contact/contactless modes of operation an antenna control unit 1230 may be provided, connected between combi chip 24 and RF antenna 26 and adapted to enable/disable the flow of RF signals between RF antenna 26 and combi chip 24. According some embodiments of the present invention control unit 1230 may prevent RF signals picked by antenna 26 from reaching combi chip 24 by, for example, shorting of the RF signals picked up by antenna 26. Antenna control unit 1230 may be controlled by a signal, such as signal ANT DIS, provided by uP 1222. Antenna control unit 30 may be embodied in any known way and preferably by using electronic switches (diodes, transistors, or any other controllable semiconductor shorting device or method). Coordination mechanism for the modes of operation of combi chip 24 may further comprise field sense (FS) signal produced by RF antenna 26 and provided to uP 1222. FS signal may be, for example, 'true' only when an RF signal of high enough level is sensed by RF antenna 26. According to an embodiment of the present invention signal FS may be provided when RF field is sensed regardless of the status of switch 30.

With combi chip 24 which supports concurrent activation of both contact and contactless modes of operation, field sense signal may alternatively be manifested by using the uP 1222 Vcc pad as an input, sensing the voltage level at Vcc pad of combi chip 24, or by sensing the voltage level at the status pad of combi chip 24 (require software support in combi chip 24).

When there is no signaling of presence of power on MIC line from headset jack 40 or 5V signaling from USB connector 42 or signal via antenna 26 in the form of RF signals, adapter 1200 is in 'off' state. Power supply to adapter 1200 and communication with it may be initiated by either a user of the personal electronic device connecting the adapter to it and invoking an application program at the personal electronic device that activates adapter 1200 and initiates communication between the personal electronic device and uP 1222 and, via uP 1222, enabling combi chip 24 to communicate in contact mode, or by exposing the adapter to an RF field of an external contactless smart card reader sensed by RF antenna 26, enabling adapter 1200 to perform contactless communication session. It will be noted that for contactless mode communication with combi chip 24 no power from power supply unit is required and all the power that is needed may be provided from the RF energy of the received RF signal, as is known in the art.

Adapter 1200 may be in one of several modes of operation, dictated mainly by the combination of power sources provided to adapter 1000 from a received RF signal, from a personal electronic device connected to adapter 1000 via headset jack 40 or from power supply pin of a USB plug connected via USB connector 42, and by the timing of their appearance/disappearance with respect to each other. When adapter 1200 is in 'off' state (and as a result combi chip 24 is in off state) and communication in contact mode, either via headset jack 40 or USB connector 42, is first to be initiated, uP 1222 may wake up/resume operation and, intending to communicate with Combi-chip 24, issuing ANT DIS signal which may prevent subsequent RF signal received by RF antenna 26 from reaching to combi chip 24 while operating in contact mode, for example by shorting this RF signal. This may be performed, for example, by controllable switch 1230 which is normally open. When controllable switch 1230 receives signal ANT DIS it may close and short the antenna terminals. This is done to avoid attempts to concurrently activate combi chip 24 in both contact and contactless modes. This functionality is especially important for combi chips which do not support concurrent activation of both contact and contactless modes of operation. The operation of adapter 1000 in this contact mode may continue as required. When this contact mode session ends, uP 1222 may turn signal ANT DIS off thus removing the short over RF antenna 26 terminals, enabling subsequent contactless operation in the presence of RF field. In this case FS signal turns TRUE, which in turn may cause uP 1222 to wait with any further contact communication sessions until FS signal becomes FALSE again, indicating the removal of the RF field, or the removal of the adapter along with the personal electronic device it is connected to away from the RF field. Alternatively uP 1222 may elect to force activation of unit 1230 while FS is still true so as to force ending of the contactless operation in order to allow contact operation. In case where combi chip 24 can support concurrent contact-contactless operation, unit 1230 may not necessarily be required. These manners of switching back and forth between contact and contactless modes of operation, may be for example part of a multi stage operation in which a contactless mode has been initiated in order to, for example, perform a money transaction, and a user input is required as part of the scenario of operation. In such typical event, when the user's input is required, adapter 1000 may be taken out of the RF field thus enabling switching to contact mode and the switch to contact mode may enable the entry of user's input to be transferred to combi chip 24. According to this example, once the user finished entering the input the adapter may be brought closer to the contactless smart card reader thus causing an RF field to be sensed by antenna 26 enabling initiation of contactless mode session. According to another embodiment the contact mode session may terminate, for example, by the termination of the powering audio signal, for example due to a respective command issued by the program that activated that mode.

Activation of the adapter and communication in contact mode as a result of input from the user of the personal electronic device may be enabled by a program running or being executed on the personal electronic device which may cause issuance of a signal on RS line which will activate uP 1222 via Rx/Sync pin in addition to activating its power supply via the Mic signal, or, if adapter 1200 is connected to a personal electronic device via USB port, a 5V signal may, in addition to activating its power supply, be issued at a USB PRESENT pin, to activate uP 1222 USB communication channel and communicate with the personal electronic device.

Communication in contact mode may enables transfer of data between combi chip 24 and uP 1222, such as data associated with transaction that was carried out previously in contactless mode, and transfer data between uP 1222 and the personal electronic device via audio channels RS and MIC when connected via headset jack 40, or via D+/D− lines when connected via USB connector 42. Such data from combi chip 24, or portion of it, may be presented to the user of the personal electronic device. If response or input from the user is required for the operation of adapter 1200, or for the transaction performed by it, this data may be exchanged between the personal electronic device and uP 1222 via RS and MIC channels when connected via headset jack 40, or via D+/D− lines when connected via USB connector 42, and then provided to combi chip 24. The types of data that may be exchanged between adapter 1200 and the personal electronic device are data indicative of the performed operation/transaction by adapter 1200, such as paid sum, details of purchased items, etc. Once this data exchange is finished and antenna disable signal ANT DIS is deactivated, uP 1222 may check the status of the FS signal and if "false" may report it back to personal electronic device which may return adapter 1200 to off state until further initiation of power and communication.

When adapter 1200 is in 'off' state and RF signals are received in RF antenna 26 adapter 1200 switches to contactless mode of operation of combi-chip 24. In such a case uP 1222 remains dormant unless it is waked up by the personal electronic device. In such case the presence of signal FS will signal uP 1222 to avoid any attempt to switch adapter 1200 into contact communication mode. As long as switch 30 is open, and is not intentionally closed by uP 1222, the RF signal received from RF antenna 26 is presented to combi chip 24, energizes it and the communication in contactless mode proceeds as is known in the art. Once a communication in contactless mode terminates, adapter 1200 may return to 'off' state until further initiation of communication. When adapter 1200 is in contactless communication mode no contact communication in adapter 1200 between uP 1222 and combi chip 24 may be performed. In embodiments where the combi chip when in use allows concurrent communication, both in contact mode and in contactless mode, the above limitation may not be necessary or be applied. As described above a typical use of adapter 1200 may include several segments along the time axis in which after contactless session has been established and a transaction that takes place during the contactless session requires an input from the user, the contactless mode may terminate in order to enable establishing of contact mode communication, and after the data transaction in contact mode ends, terminating the contact mode session to enable reactivating of a contactless mode to enable conveying, for example, the user's input to the contactless smart cards reader. In other embodiments an application running on the personal electronic device may cause intentional termination of a contactless mode session of adapter 1000 in order, for example, to enable entering into a contact mode session. Data indicative of the performed transaction may be stored in combi chip 24 and may be sent to the electronic personal device via uP 1222 after adapter 1200 terminates its contactless communication.

Figure 3:
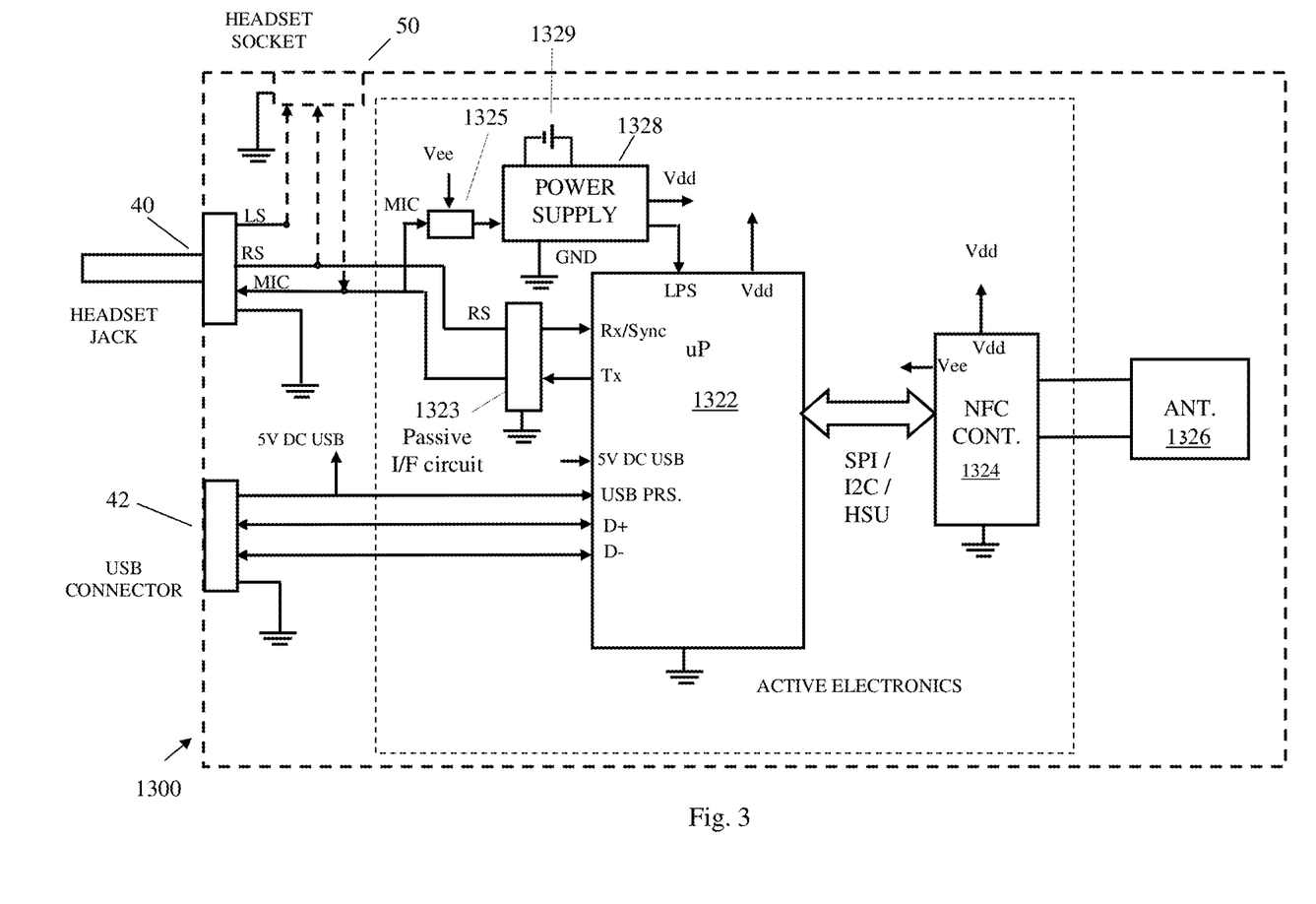
FIG. 3 schematically presents an adapter for enabling communication between personal electronic device and smart card reader using a Near Field Communication (NFC) controller for controlling the contactless communication, according to embodiments of the present invention.

Reference is made now to FIG. 3, schematically presenting adapter 1300 for enabling communication between personal electronic device and smart card reader using a Near Field Communication (NFC) controller for controlling the contactless communication, according to embodiments of the present invention. Adapter 1300 may comprise headset jack communication connector 40 connecting lines RS and MIC, and optionally LS, to uP 1322, similar to corresponding lines in FIG. 2. Optionally, adapter 1300 may comprise USB communication connector 42. Data between the personal electronic device and uP 1322 exchanged via USB communication connector 42 may be exchanged via lines D+, D− as is the case in USB channel. 5V DC signal may further be provided to uP 1322 at pin USB PRS to signal presence of USB communication connection. The data exchanged between the personal electronic device and uP 1322 via USB connector 42 may include numerical or textual information, value of parameters, control data and the like, as may be required to satisfy the communication between program or programs running on the personal electronic device and program or programs running on uP 1322. This data may be represented by electronic signals conforming to the USB communication format. Supply of 5V DC power from USB communication connector may be used to provide power to power supply unit 1328 adapter and optionally to recharge battery 1329. Powering of power supply 1328 by 5V DC from USB communication connector may be embodied similarly to the arrangement presented in FIG. 2 and described in the corresponding portions of the description above.

Adapter 1300 may optionally comprise headset socket 50 to enable connection of user's headset. Antenna 1326 may be connected to NFC controller 1324 as is known in the art. NFC controller 1324 may communicate with uP 1322 in one of known protocols such as SPI (Serial Peripheral Interface) or I2C (Inter Integrated Circuit) or HSU (High Speed UART). Adapter 1300 may be powered from battery 1329 and via power supply unit 1328. Power supply 1328 may be enabled by the DC portion of the signal in MIC line, by the presence of 5V DC USB (similar to the arrangement described with respect to FIG. 2 but details are not shown here) and by Vee DC voltage produced by NFC controller 1324 when antenna 1326 is exposed to RF field. The combining of the enabling voltages to power supply 1328 may be done by combiner 1325. Other basic functionalities of adapter 1300 operate similarly to those of adapter 1200. Yet, usually NFC controller 1324 does not contain secured element (SE) as is common in combi chips such as combi chip 24 (FIG. 2). In such circuitry the securing of the communication and the data transactions may be assigned to the personal electronic device.

Figure 4A:
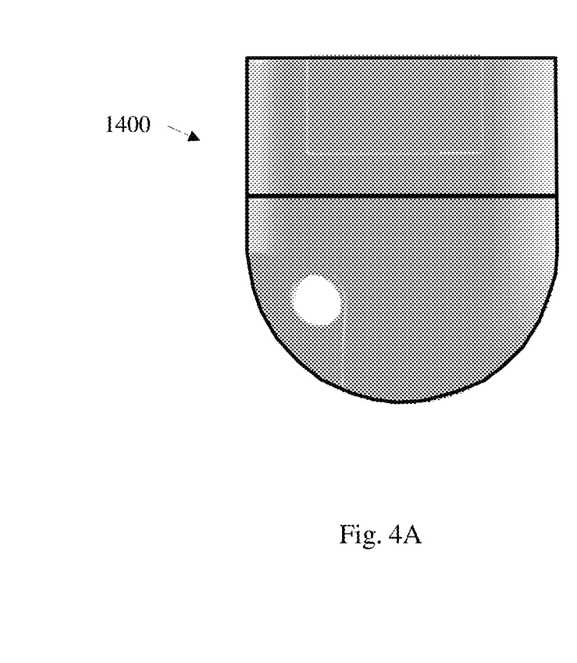
FIGS. 4A, 4B and 4C schematically illustrate full packaging of an adapter, the adapter without its casing and the casing, respectively, according to embodiments of the present invention.
Figure 4B:
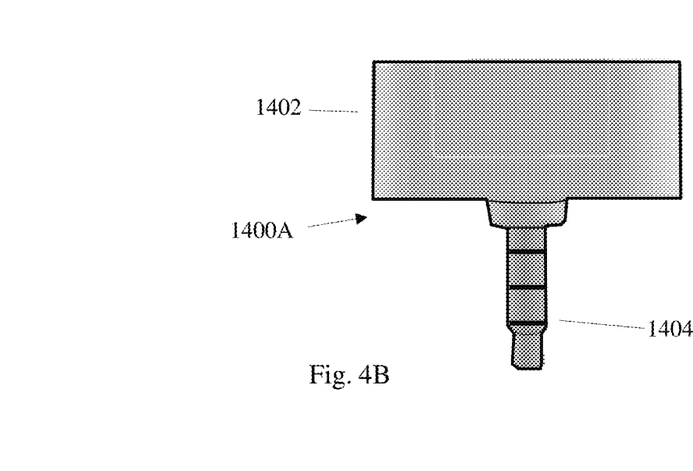
Figure 4C:
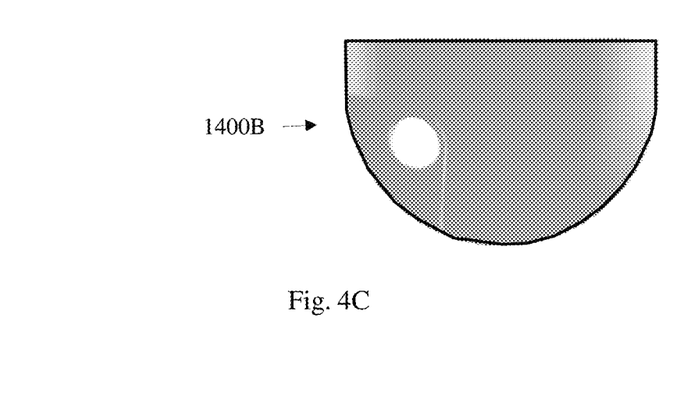

Reference is made now to FIGS. 4A, 4B and 4C which schematically illustrate full packaging of an adapter, the adapter without its casing and the casing, respectively, according to embodiments of the present invention. Adapter for enabling communication between a personal electronic device and a smart card reader, such as adapters 1000, 1200 or 1300 which were described above, may be packed in a package 1400 which comprise the adapter itself 1400A and a case 1400B to cover and protect the headset jack. Adapter 1400A may comprise electronic and antenna portion 1402 and headset jack portion 1404. When headset jack 1404 is fully inserted into a respective cavity in cover 1400B it is fully enclosed and protected in it and the engaged elements 1400A and 1400B form a nicely designed small unit that may be kept, for example, tied to a key ring.

Figure 5A:
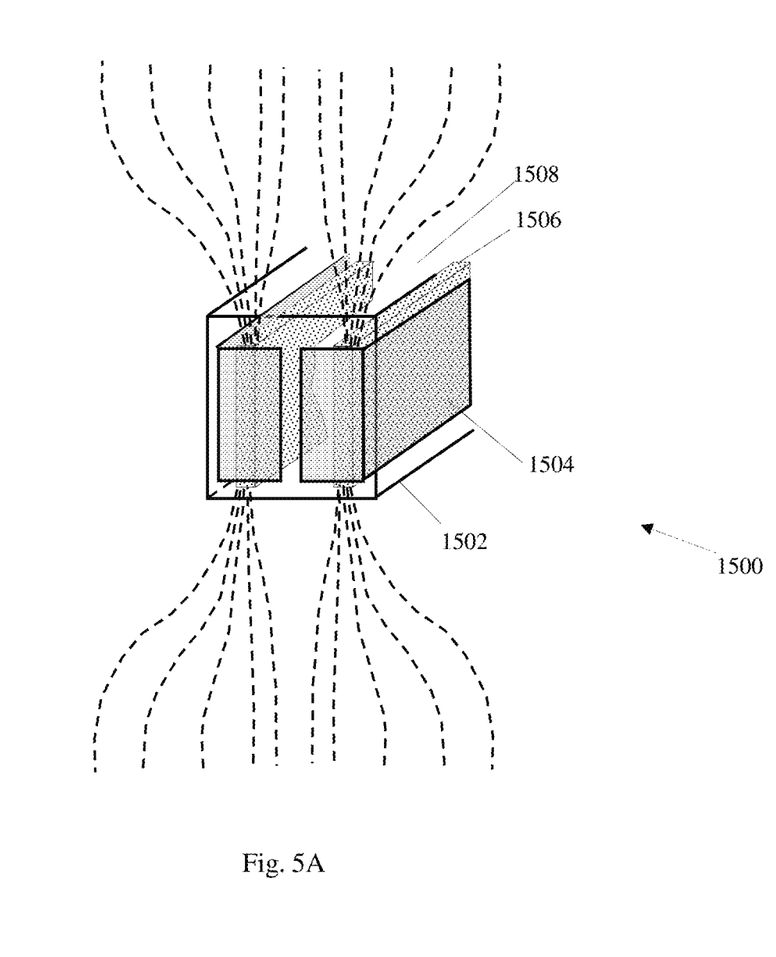
FIGS. 5A, 5B and 5C schematically illustrating compact antenna arrangement in an adapter in partial isometric view, top view and full isometric view, respectively, according to embodiments of the present invention.
Figure 5B:
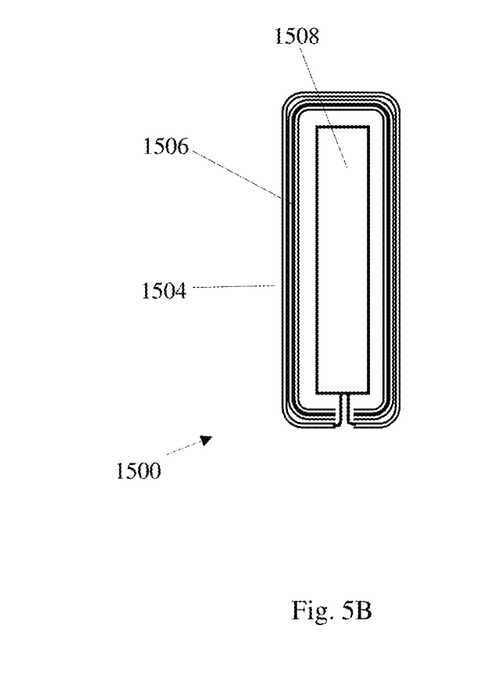
Figure 5C:
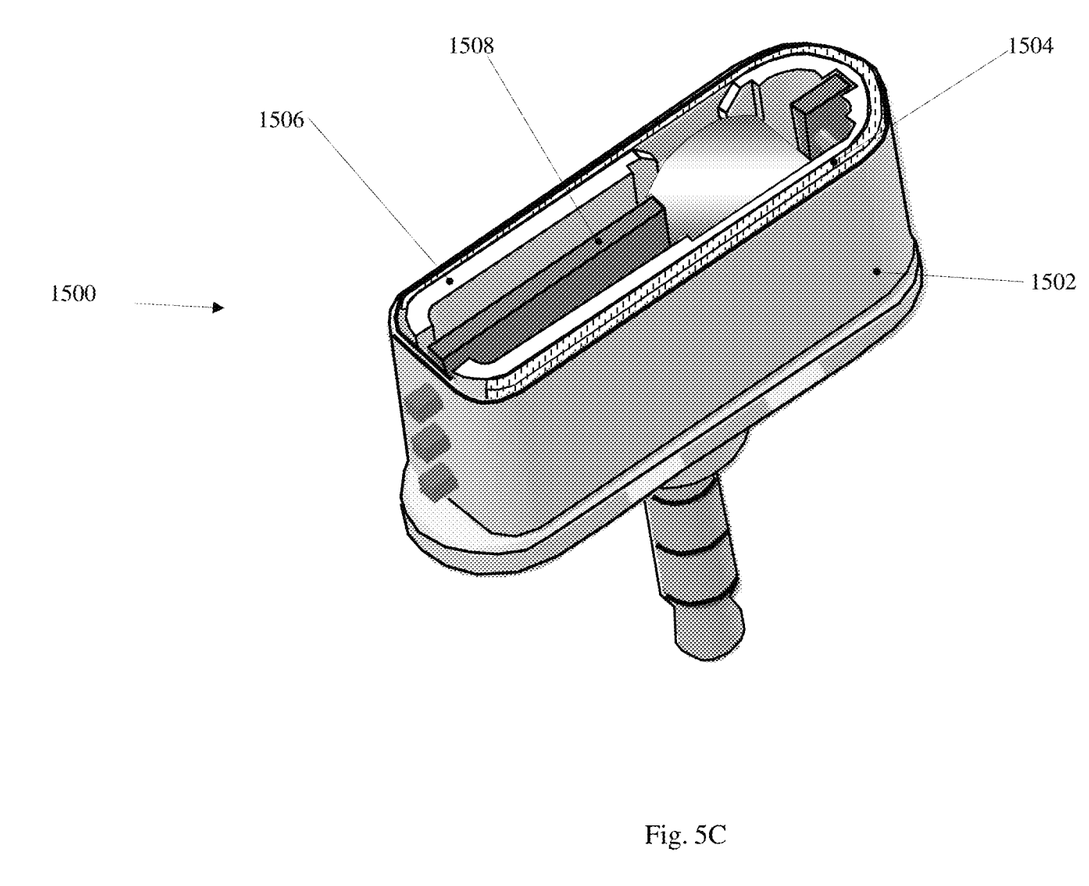

Reference is made now to FIGS. 5A, 5B and 5C, schematically illustrating compact antenna arrangement 1500 in an adapter in partial isometric, partially transparent view, top view and full isometric view, respectively, according to embodiments of the present invention. Due to the need to pack the adapter, such as adapters 1100, 1200 and 1300, in as small as possible packaging, the antenna comprised in the adapter, for receiving and transmitting RF signals, may be small. In order to amplify the RF signals received in the antenna a unique arrangement is disclosed in FIGS. 5A and 5B. Arrangement 1500 of the electronic units of the adapter may include antenna windings or wounds 1504 preferably made of flat flexible conduits, wrapped on the outer side of ferrite unit 1506 that is made preferably of flat piece of ferrite formed to surround, almost fully around the electronics installation space 1508—as seen in top view of FIG. 5B. Having the ferrite element placed inside the wounds of antenna 1504, causes RF field lines in the vicinity of adapter 1500 to flow through ferrite element 1506 in higher density than where there is no ferrite element, due to the very low (virtually—zero) reluctance to RF field, as is schematically illustrated by the dashed lines in FIG. 5A.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for enabling a personal electronic device to communicate over near field communication (NFC), the system comprising:
   a first adapter configured to convert signals between a universal serial bus (USB) signal format and signals in a format of data modulated over audio signals, the first adapter comprising:
   a USB connector configured to communicate with the personal electronic device using signals in the USB signal format;
   a headset audio connector configured to communicate with a second adapter using the modulated audio signal format; and
   a controller configured to convert signals between the USB signal format received from the USB connector and signals in the modulated audio signal format to be communicated over the headset audio connector of the first adapter to the second adapter;
   a second adapter configured to exchange data with the headset audio connector of the first adapter using the signals in the modulated audio signal format and to switch between communicating signals in a contact mode of communication and a contactless mode of communication over near field communication (NFC).

2. The system of claim 1 wherein said controller in the first adapter comprises a non-transitory storage medium storing programs and parameters.

3. The system of claim 1 wherein the contact communication of said second adapter is disabled in response to radio frequency (RF) field sensed by said antenna.

4. The system of claim 1, wherein a RF signal received by said antenna is prevented from reaching said combination contact/contactless chip in response to an ANT DIS signal.

5. The system of claim 1, where said second adapter further comprises a power supply unit.

6. The system of claim 5 further comprising a charger unit to charge a battery comprised in said power supply unit.

7. The system of claim 5, wherein said power supply further comprises DC-DC step-down converter for receiving electrical power from said power supply unit and convert its voltage to approximately 1.8V DC.

8. The system of claim 7, wherein said DC-DC step-down converter is enabled only if at least one signal from a list comprising 5V USB signal and MIC signal from said headset audio connector is present.

9. The system of claim 1, wherein the first adapter comprises a voltage regulator to regulate DC voltage received from the USB connector and to regulate and provide DC voltage to the headset audio connector.

10. A method for enabling a personal electronic device to communicate over near field communication (NFC), the method comprising:

in a first adapter configured to convert signals between a universal serial bus (USB) signal format and signals in a format of data modulated over audio signals:
- communicating with the personal electronic device via a USB connector supporting signals in the USB signal format;
- converting signals between the USB signal format received from the USB connector and signals in the modulated audio signal format; and
- communicating the signals in the modulated audio signal format with a second adapter via the headset audio connector, in the second adapter configured to exchange data with the headset audio connector of the first adapter using the signals in the modulated audio signal format:
- switching between communicating signals in a contact mode of communication and a contactless mode of communication over near field communication (NFC).

* * * * *